United States Patent [19]

Maejima

[11] 4,420,759
[45] Dec. 13, 1983

[54] CARD LOCKING DEVICE FOR TIME RECORDER
[75] Inventor: Kenji Maejima, Yokohama, Japan
[73] Assignee: Amano Corporation, Yokohama, Japan
[21] Appl. No.: 238,556
[22] Filed: Feb. 26, 1981
[30] Foreign Application Priority Data
Mar. 14, 1980 [JP] Japan .................................. 55-32472
[51] Int. Cl.³ ............................................... G07C 1/08
[52] U.S. Cl. ........................................ 346/82; 346/86
[58] Field of Search ...................................... 346/82–86, 346/96, 99, 104, 133, 134, 129

[56] References Cited
U.S. PATENT DOCUMENTS

2,810,621 10/1957 Hibbard et al. .................. 346/82 X
2,838,361 6/1958 Findlay et al. ........................ 346/83
3,167,380 1/1965 Williams ............................... 346/82
3,512,175 5/1970 Williams ............................... 346/82

Primary Examiner—G. Z. Rubinson
Assistant Examiner—W. J. Brady
Attorney, Agent, or Firm—Wenderoth, Lind & Ponack

[57] ABSTRACT

A card locking device for use in a time recorder which is constructed in such a manner that while a wire type dot matrix type printer performs its printing operation such as time printing or the like on a time card inserted into a card guide passage, a locking lever is effective in clamping the inserted time card in the card guide passage for the purpose of preventing it from being removed therefrom, and on completion of the intended printing operation, the locking lever is disengaged from the inserted time card so that the time card can be removed.

6 Claims, 11 Drawing Figures

CARD LOCKING DEVICE FOR TIME RECORDER

BACKGROUND OF THE INVENTION

1. Field of the Invention

The present invention relates to a card locking device incorporated in a time recorder which prevents misprinting caused by early removal of a time card prior to normal printing operation.

2. Description of the Prior Art

When inserting a time card into a conventional time recorder for printing a certain item such as company arrival time or the like on it, an operator inserts his time card into the card guide passage through the card insert pocket on the time recorder and then when he judges that the intended printing has been completed, he removes it from the card insert pocket. Since the insertion and removal of the time card in and from the time recorder are performed by an individual operator's hand, it is often found that he removes his time card too early either inadvertently or intentionally. Obviously, such early removal will always cause misprinting on the time card. The conventional time recorder contains a printing section which includes a series of printing type arranged in the form of a ring, and a printing hammer, and is operated in such a manner that printing is performed immediately after inserting a time card to a printing start position. Thus, little misprinting is caused with the conventional time recorder. A modern electronic time recorder having a printing section which includes a wire type dot matrix printer (so-called electronic printer), has a problem that a series of irregularly typed characters are printed in an upwardly inclined alignment in the direction in which the time card is removed when an operator removes his time card therefrom too early during the printing operation. This occurs because the electronic time recorder is constructed such that it prints while displacing the dot matrix printer transversely relative to the direction of insertion and removal of the time card.

SUMMARY OF THE INVENTION

Thus, it is a principal object of the present invention to provide a card locking device for a time recorder which ensures tight locking of the time card for the purpose of preventing the time card from being removed from the card guide passage while a wire type dot matrix printer is printing on the time card inserted into the card guide passage, the locking being effected by means of a locking lever which is adapted to engage the time card to hold the same in the card guide passage.

It is other object of the present invention to provide a card locking device for a time recorder which ensures tight locking to prevent a time card from being removed therefrom during printing, without any possibility of injuring the inserted time card when holding the same in the card guide passage by means of the locking lever.

It is another object of the present invention to provide a card locking device for a time recorder which is constructed such that the respective locking and unlocking activities of the locking lever are achieved in association with transverse displacement of the wire type dot matrix printer during printing with the aid of a motor for driving the dot matrix printer.

In order to accomplish the above mentioned objects it is proposed in accordance with the present invention that a locking lever is arranged adjacent to the card guide passage into which a time card to be printed is inserted. The locking lever is provided with a spring means for applying a resilient force in such a direction as to displace the lever toward the card guide passage. While no printing operation is being performed, that is, when no time card is inserted in the card guide passage, the locking lever is rotated apart from the card guide passage against the resilient force of the spring means by means of a cam mechanism. When a time card is inserted and thereby the wire type dot matrix printer starts its printing operation, the locking lever is disengaged from the cam mechanism and then is rotated toward the card guide passage, whereby the time card is locked in the card guide passage.

In the card locking device in accordance with the present invention, practical locking activity is achieved between a locking piece extending downwards from the front part of the locking lever at a certain forward inclination angle relative to the vertical plane and a locking counterplate located on the opposite side to the card guide passage. Since the moderate resilient locking force is produced by a spring means there is no danger that the time card, which is made of paper, will be injured. Further, due to the fact that the downwards extending inclined locking piece is adapted to engage the inserted time card, it is ensured that no misprinting caused by early removal of the time card can occur.

Furthermore, the cam mechanism for actuating the locking lever is secured to the rotating shaft of a second cam mechanism for the dot matrix printer in a coaxial relation relative to the latter cam mechanism, the second cam mechanism serving to transversely displace the dot matrix printer. It is therefore possible to rotate both cam mechanisms by a single motor. Other advantageous features of the present invention are that timing for the printing operation by the dot matrix printer, as well as the timing of engagement and disengagement of the locking lever, can be easily adjusted, and card locking is performed by means of the locking lever at exactly the same time when the dot matrix printer starts its printing operation, while card unlocking is performed also by means of the locking lever at exactly the same time when the printing operation is completed.

Other objects and advantageous features of the present invention will be apparent from the following description.

BRIEF DESCRIPTION OF THE ACCOMPANYING DRAWINGS

Now the present invention will be described in more details with reference to the accompanying drawings which illustrate a preferred embodiment of the invention, in which.

DETAILED DESCRIPTION OF THE PREFERRED EMBODIMENT OF THE INVENTION

Before describing the card locking device in accordance with the present invention, a typical time recorder for which the present invention is practiced is described below with reference to FIG. 1.

In the drawing the reference numeral 1 designates a housing of the time recorder on which a card insert pocket 2 is arranged displaceable along the guide shaft 3 in the transverse direction, that is, in the direction at a right angle to the plane of the drawing, guide shaft 3 extending horizontally through the housing 1. Thus, it is possible to change the printing position on a time card to be printed by displacing the card insert pocket 2. The reference numeral 4 designates a card guide passage for the time card vertically arranged in the housing 1, card guide passage 4 being constructed of two parallel guide plates 4a and 4b and its upper end being connected to the lower part of the card insert pocket 2. The reference numeral 5 designates a guide rod which is disposed in the housing 1 in parallel to card guide passage 4, guide rod 5 being supported displaceable in the vertical direction and having a sliding frame connected thereto which is formed with a rack 7 which serves for determining a certain printing stage on the time card. The reference numeral 8 designates a ratchet wheel which is in engagement with rack 7 to be rotated by one revolution per day by means of a motor (not shown) so that stage feeding is effected. Specifically, rachet wheel 8 is adapted to feed the sliding frame 6 in the vertical direction by one stage per day by way of engagement with the rack 7. Further, the arrangement is made with the ratchet wheel 8 such that on completion of 16 days of stage feeding, the sliding frame 6 falls down to the lowermost position as illustrated in the drawing, because the ratchet wheel 8 is disengaged from the rack 7. The reference numeral 9 designates a mounting plate associated with sliding frame 6, mounting plate 9 being provided with an actuator 10 on its upper end part which is rotatably supported by means of a shaft 11 which extends through the mounting plate 9. Actuator 10 is formed with a card receiving portion 10a at its front end which is located in alignment with card guide passage 4. The reference numeral 12 designates a cooperating piece which is rotatably supported by means of a shaft 13 at the lower end part of mounting plate 9, the upper part of cooperating piece 12 being operatively connected to the lower end part of the actuator 10. Thus as the actuator 10 is rotated about the shaft 11 in the clockwise direction by means of the time card which is inserted through the card insert pocket 2, the cooperating piece 12 is also rotated about the shaft 13 in the counter clockwise direction by way of the operative connection between the both components 10 and 12, whereby the pushing portion 12a of the cooperating piece 12 comes in contact with the microswitch 15 fixedly secured to the sliding frame 6 to turn on microswitch 15. As described in more detail below, the microswitch 15 functions as an actuating switch which serves to actuate the printing section of the time recorder. Thus once the microswitch 15 is turned on, the whole operation become effective.

Next, a typical printing section which is incorporated in the time recorder will be described in more details with reference to FIGS. 1 to 4.

Figure 2:
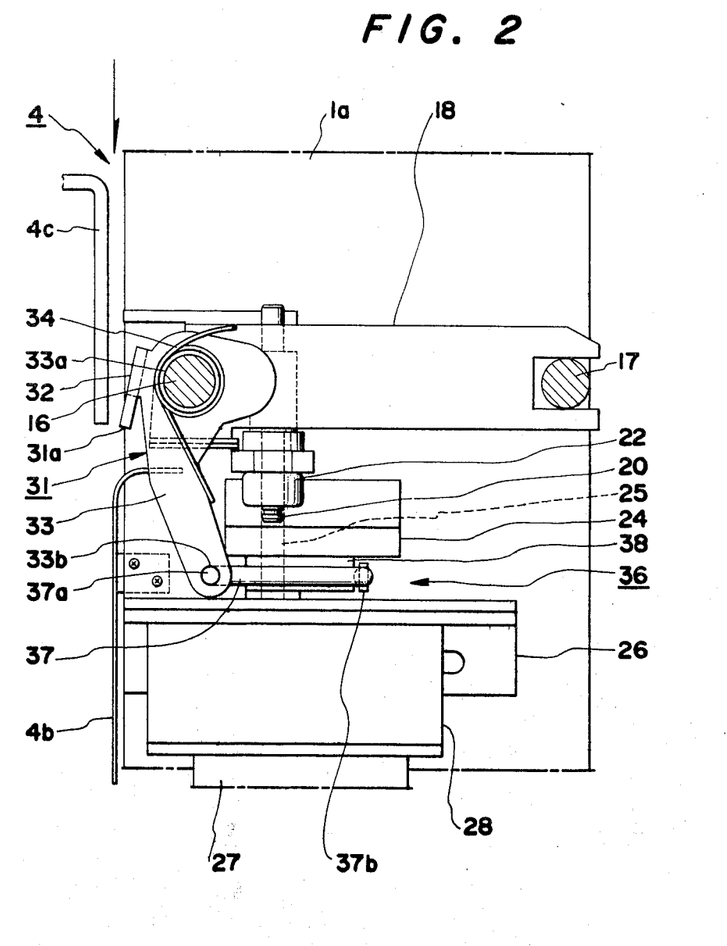
FIG. 2 is a sectional side view of the essential part of the card locking device in accordance with the present invention, shown in an enlarged scale.
Figure 3:
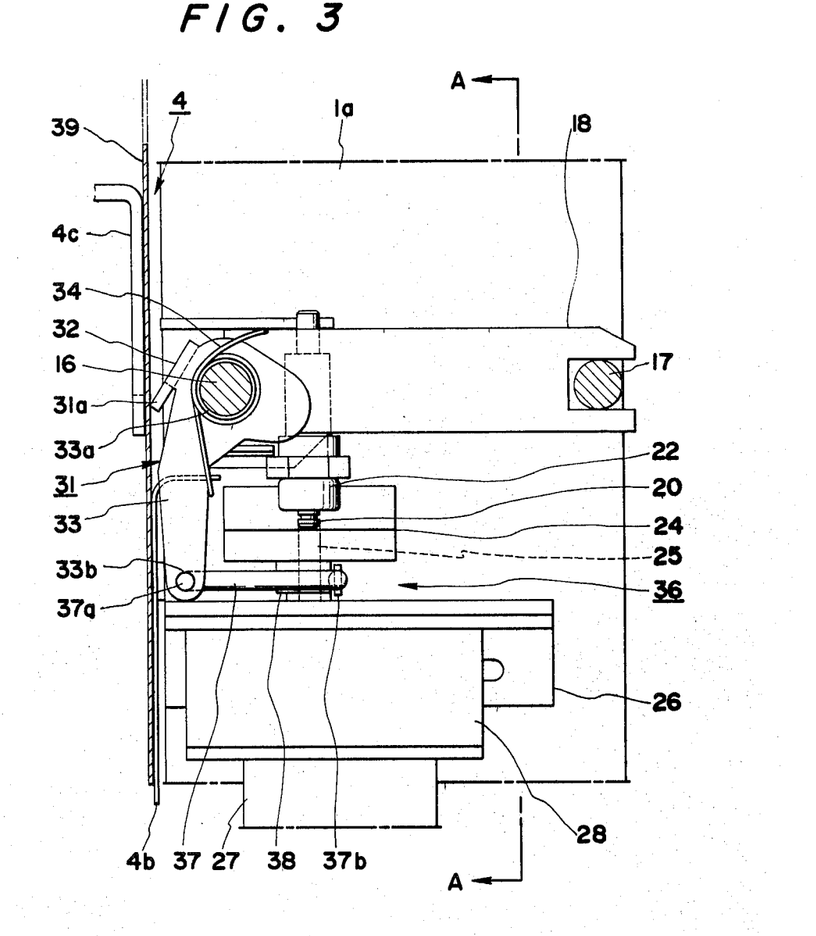
FIG. 3 is a sectional side view similar to FIG. 2 of the essential part of the card locking device shown in the locked state.
Figure 4:
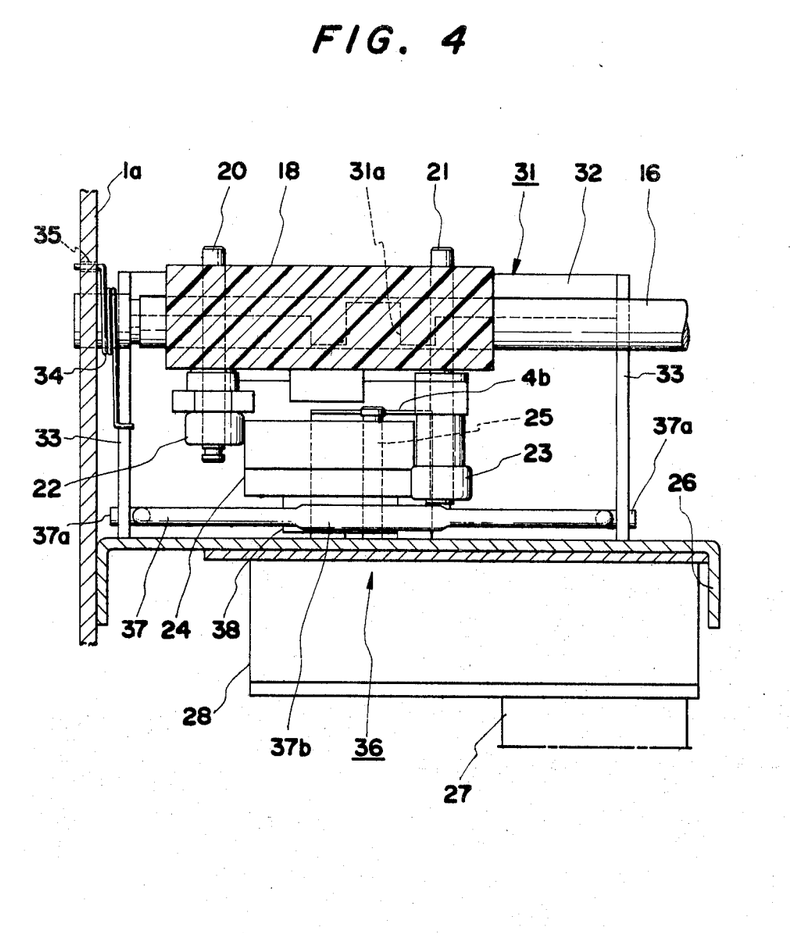
FIG. 4 is a sectional view of the essential part of the card locking device, taken along line A—A in FIG. 3.

In the drawings the reference numerals 16 and 17 designate guide shafts which extend in parallel to each other in the housing 1a and the reference numeral 18 designates a printer base mounted between the guide shafts 16 and 17. The printer base 18 is arranged horizontally displaceable, while being guided by means of both guide shafts 16 and 17. Further, the printer base 18 is provided with a commercial wire type dot matrix printer 19 (hereinafter referred to simply as dot printer) fixedly mounted thereon. In FIGS. 2 to 4 the dot printer 19 isn't shown but it is assumed that in practice the dot printer 19 is mounted on the printer base 18 in the same manner as shown in FIG. 1. As best seen from FIG. 1, the printing head 19a of the dot printer 19 is protrudes horizontally toward the upper part of the guide passage 4 to print certain working data on the time card inserted in the card guide passage 4. On the bottom of the printer base 18 are located two roller shafts 20 and 21 (only shaft 20 being shown in FIGS. 2 and 3) which extend in parallel to one another in the vertical direction at a certain distance therebetween. The roller shafts 20 and 21 are provided with guide rollers 22 and 23 rotatably fitted thereon. The reference numeral 24 designates a cam disc which is interposed between the guide rollers 22 and 23, cam disc 24 containing a cam shaft 25 fixedly secured thereto which is adapted to be rotated by means of a motor 27 fixed to the central part of the frame 1a by way of a bracket 26. The reference numeral 28 designates a transmission casing with reduction gears (not shown) incorporated therein for transmitting driving power of the motor 27 to the cam shaft 25 at a reduced speed of rotation. Thus, as the cam disc 24 is rotated, the printer base 18 is horizontally displaced by way of the power transmission system constructed in the above described manner, while being guided with the aid of the guide shafts 16 and 17, whereby the dot printer 19 performs forward movement relative to the time card inserted into the card guide passage 4.

Figure 7:
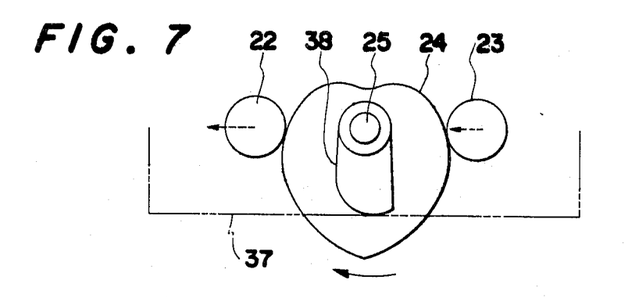
FIGS. 7 to 9 are schematic plan views of cam mechanisms showing operations of the cam mechanisms in a stepwise manner.
Figure 8:
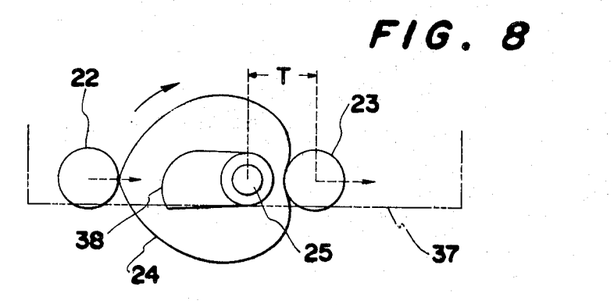
Figure 9:
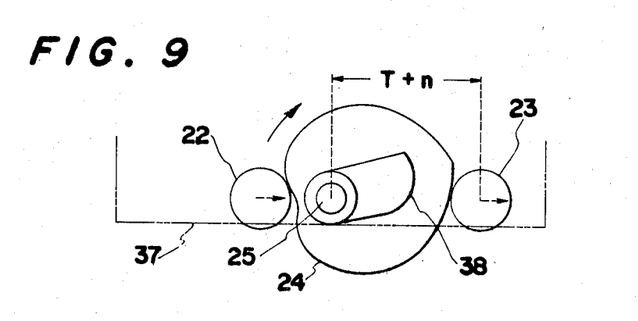

FIGS. 7 to 9 schematically illustrate the movement of the cam disc 24 as described above in plan view. As is apparent from the drawings, the cam disc 24 is shaped in the form of a heart and is secured to the cam shaft 25 in an eccentric position. Specifically, FIG. 7 illustrates the location of the cam mechanism at a starting time (prior to commencement of the printing operation). As the cam shaft 25 starts its rotation from the illustrated location, the cam disc 24 is rotated in the clockwise direction whereby both the guide rollers 22 and 23 are displaced to the left by means of the cam face of the cam disc 24 which comes in contact with the guide rollers 22 and 23. As a result, the dot printer 19 together with the printer base 18 is displaced toward the printing start position. Next, FIG. 8 illustrates another location of the cam mechanism where the cam disc 24 has been rotated by about 90 degrees and thereby the dot printer 19 has reached the printing start position. Printing operation starts at this position. As the cam disc 24 is further rotated in the clockwise direction from the position as illustrated in FIG. 8, the guide rollers 22 and 23 are displaced to the right by means of the cam face of the cam disc 24 which comes in contact with them, whereby the dot printer 19 is transversely displaced to the right, while printing on the time card with the use of a certain dot matrix pattern. FIG. 9 illustrates still another location of the cam mechanism just before completion of the transverse displacement which is accompanied by the printing operation. If the distance between the cam shaft 25 and the one guide roller 23 at the printing start time is represented by T as illustrated in FIG. 8, the distance therebetween at the location as illustrated in FIG. 9 is represented by T+n. This means that the dot printer 19 is transversely displaced by the distance n while performing the printing operation (hereinafter referred to as transverse printing displacement). When the cam disc 24 is rotated by 180 degrees from the position in FIG. 8, the transverse printing displacement of the dot printer 19 comes to an end and at that time the intended printing operation is completed. After completion of the transverse printing displacement of the dot printer 19 together with the guide rollers 22 and 23, rollers 22 and 23 are oppositely displaced toward the position illustrated in FIG. 7, as the cam disc 24 is further rotated. Finally, one cycle of transverse printing displacement is completed when the cam disc 24 is rotated by one revolution and comes to a stop at the position shown in FIG. 7.

Figure 10:
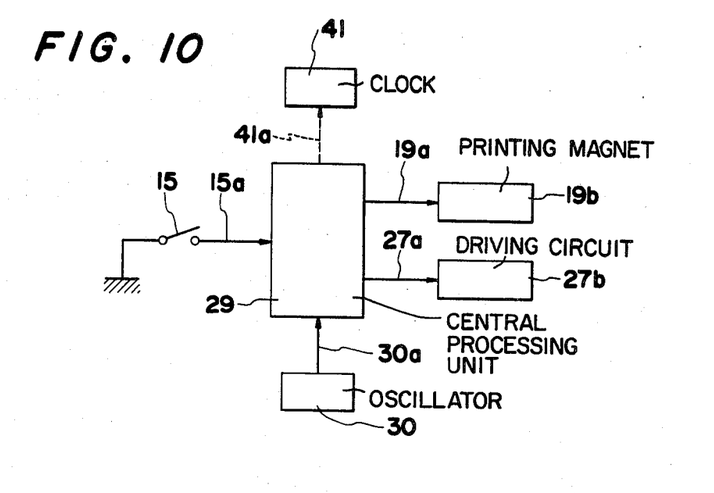
FIG. 10 is a schematic illustration of a control system for the card locking device, in the form of a block diagram.

FIG. 10 is a block diagram which schematically illustrates a control section by which the dot printer 19 and motor 27 are controlled. In the block diagram the reference numeral 29 designates a central processing unit comprising a microprocessor as a main component. Central processing unit 29 additionally contains a storage device (not shown) in which a number of electronic memories are incorporated. Further the reference numeral 30 designates a time circuit comprising an oscilating circuit such as a crystal oscillator, C-MOS circuit or the like. A time signal which is to work as a reference control signal for the respective sections is delivered from time circuit 30 to the microprocessor in the central processing unit 29 via a signal line 30a. The central processing unit 29 is operated in such a manner that the data previously stored in the storage device are read out and processed in accordance with the ON-signal delivered from the microswitch 15 via a signal line 15a and then control signals derived from the data are issued to a printing magnet 19b for actuating the wires in the dot printer 19 and to a driving circuit 27b for the motor 27 so that the rotation of the motor 27 as well as the printing operation of the dot printer 19 are performed in the above described manner.

A card locking device for the time recorder with the above described printing section incorporated therein will now be described with reference to FIGS. 1 to 6.

Figure 5:
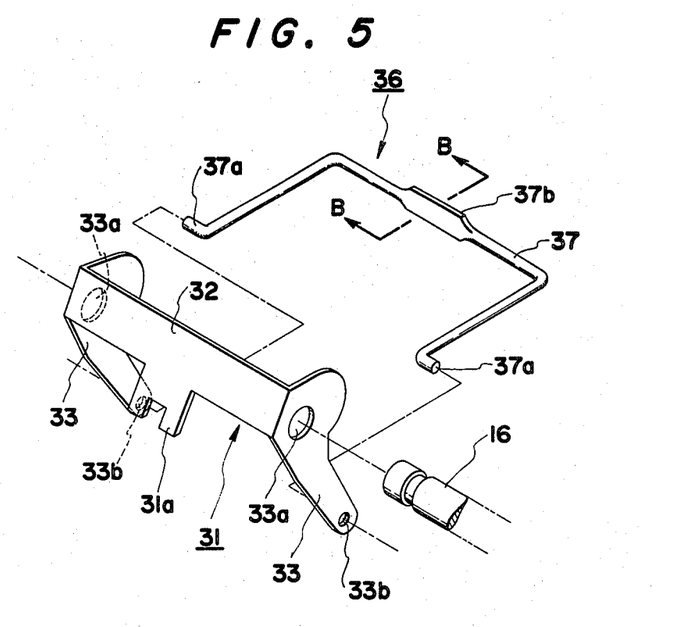
FIG. 5 is a perspective view of the locking lever, shown in a disassembled state.
Figure 6:
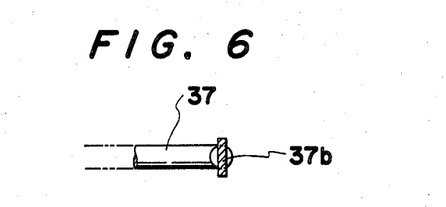
FIG. 6 is a cross-sectional view of the locking lever, taken along line B—B in FIG. 5.

A locking lever 31 which constitutes an essential component of the card locking device in accordance with the present invention includes an upper plate 32 having a pair of foot plates 33 at its both ends, foot plates 33 being bent at a right angle relative to the upper plate 32. A locking piece 31a is integrally formed at the bottom side of the upper plate 32, locking piece 31a extending downwards at a certain forward inclination angle relative to the vertical plane, as illustrated in FIG. 5. Further the locking lever 31 is supported rotatable about the guide shaft 16 which extends through drilled holes 33a on both foot plates 33, wherein the front face of locking piece 31a is orientated toward the card guide passage 4. As illustrated in FIGS. 1 to 3, the card guide passage 4 is provided with a locking counter-plate 4c which is located opposite to the locking piece 31a relative to the card guide passage 4 so that the time card inserted into the card guide passage 4 passes through the space between the locking piece 31a and locking counter-plate 4c. In FIGS. 2 to 4 the reference numeral 34 designates a coil spring which is wound about the one end of the guide shaft 16. As best seen from FIG. 4, the upper end of the coil spring 34 is inserted in a drilled hole 35 on the frame 1a, while the lower end is resiliently engaged to the back side of the one foot plate 33 of the locking lever 31 in such a manner that the locking piece 31a is rotated in the clockwise direction so as to resiliently press against the locking counter-plate 4c.

A part typically represented by the reference numeral 36 in FIGS. 1 to 5 is an actuating mechanism for controlling the operation of the lock lever 31. In the embodiment illustrated in the drawings the actuating mechanism 36 comprises a control rod 37 extended between both the foot plates 33 of the locking lever 31 and a control cam 38 secured to the cam shaft 25 in a coaxial relation to the cam disc 24. The control rod 37 is shaped in the form of a gate as illustrated in FIG. 5, wherein the foot rods bent at right angle relative to the control rod 37 has bent ends 37a which are rotatably fitted in drilled holes 33b at the lower ends of the foot plates 33, while the central part of the control rod 37 is deformed to a plate-shaped driven portion 37b. Normally the control cam 38 secured to the cam shaft 25 is adapted to rotate the whole locking lever 31 against the coil spring 34 by way of the engagement to the driven portion 37b of the control rod 37, in such a direction that the locking piece 31a is displaced apart from the card guide passage 4. As the cam shaft 25 is rotated and the control cam 38 is disengaged from the driven portion 37b of the control rod 37, the lock lever 31 is rotated toward the card guide passage 4 by means of the coil spring 31, until the time card inserted in the card guide passage 4 is tightly clamped between the front edge of the downwards extending locking piece 31a and the locking counter-plate 4c, as illustrated in FIG. 3. As a result it is ensured that the time card 39 is prevented from any early removal.

The control cam 38 will now be described below in a greater detail with reference to the above description in connection with FIGS. 7 to 9. As illustrated in the drawings, the control cam 38 is fixedly secured to the heart-shaped cam disc 24 for the dot printer in an eccentric relation relative to the cam shaft 25, orientated in the same direction as the expanded portion 24a of the cam disc 24. During stoppage of operation as illustrated in FIG. 7, the front end part of the control cam 38 is brought in contact with the driven portion 37b of the control rod 37 whereby the whole locking lever 31 is displaced against the coil spring 34 to the unlocked position illustrated in FIG. 2. When the cm shaft 25 is rotated by a certain small angle, the control cam 38 is immediately disengaged from the control rod 37, with the result that the time card 39 is locked by means of the locking piece 31a, as illustrated in FIG. 3. During the transverse printing operation illustrated in FIGS. 8 and 9, the control rod 37 is free from engagement with the control cam 38, whereby the locking piece 31a of the lock lever 31 continues to lock the time card 39 in the card guide passage 4, thus preventing the card's removal therefrom. When the cam shaft 25 is rotated by one revolution and the transverse displacement of the dot printer 19 is completed, the control cam 38 engages the control rod 37, as illustrated in FIG. 7, whereby the locking lever 31 is displaced to the unlocked position as illustrated in FIG. 2. Now the time card 39 is ready to be removed.

The card locking device in accordance with the present invention has been described above. Now operation of the card locking device will be further described in order with reference to the time chart in FIG. 11.

Figure 11:
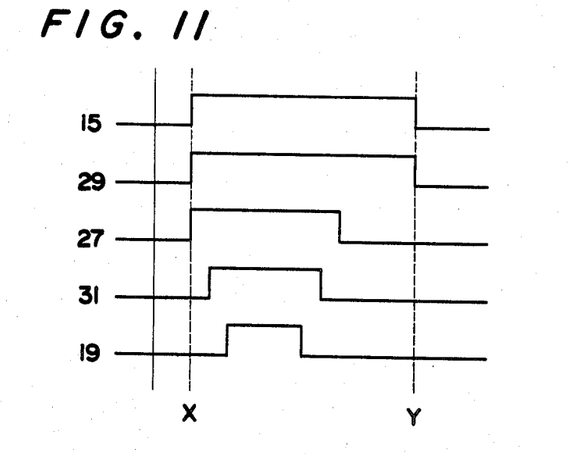
FIG. 11 is a time chart of operations of the card locking device.

Prior to use of the time recorder the card insert pocket 2 should be displaced to establish a predetermine printing position on the time card, such as a company arrival time printing position, a company leaving time printing position or the like. Then the time card 39 is inserted into the card guide passage 4 through the card insert pocket 2. When the inserted time card 39 depresses the actuator 10, the microswitch 15 is turned on whereby the central processing unit 29 in the control section starts its processing operation, causing the motor 27 to be rotated. As the motor 27 is rotated, the lock lever 31 becomes effective whereby the inserted time card 39 is locked in the card guide passage 4 and at the same time the dot printer 19 performs transverse printing displacement, while the respective printing magnets for the wires in the dot printer are energized in accordance with the command from the central processing unit 29 to perform the intended printing operation on the time card 39. On completion of the printing operation by means of the dot printer 19 the locking lever 31 is disengaged from the locked state and thereafter the motor 27 comes to a stop. At this moment the time card 39 is ready to be removed from the card guide passage 4. When an operator takes out the time card 39, the actuator 10 is restored to its original position, causing the microswitch is to be turned off and the central processing unit 29 to stop its control operation.

Figure 1:
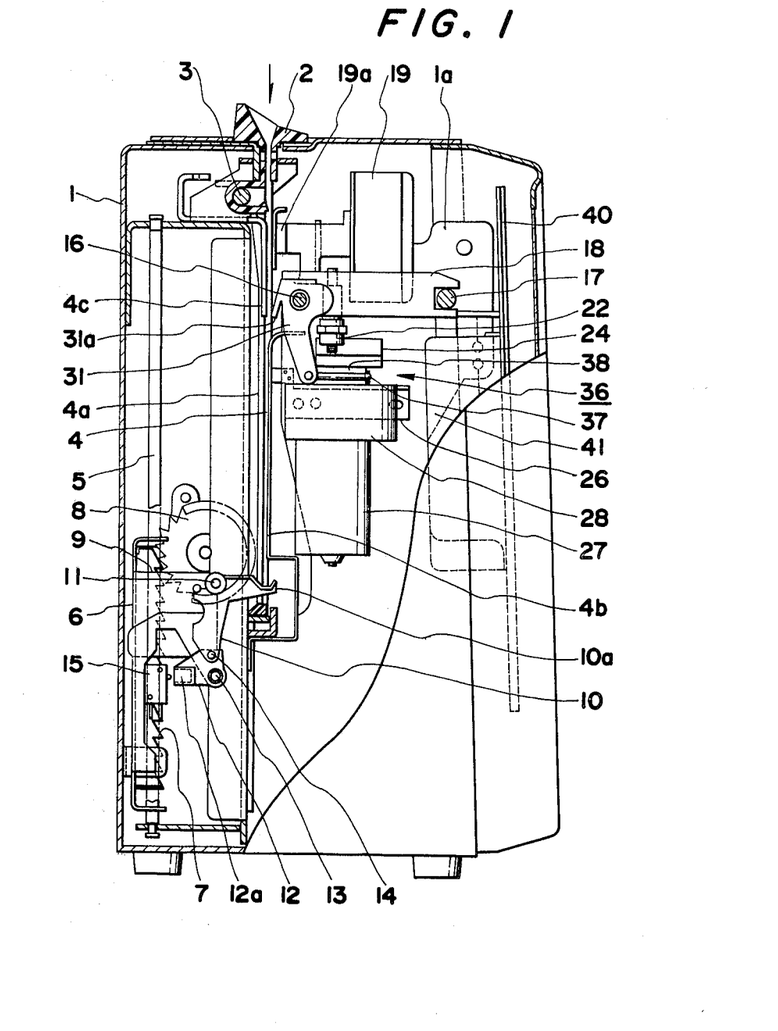
FIG. 1 is a partially sectioned side view of a time recorder with a card locking device in accordance with an embodiment of the present invention incorporated therein.

Finally it is to be added that in FIG. 1 the reference numeral 40 designates a time indicating clock panel in which a time indicating clock 41 is incorporated to indicate the existing time by means of time pointers which are driven in accordance with control signals delivered from the central processing unit 29 via a signal line 41a, as illustrated in FIG. 10.

What is claimed is:

1. A card locking device for a time recorder of the kind arranged to receive a time card into a card guide passage thereof causing a switch to be turned on to actuate a motor which displaces a wire type dot matrix printer transversely relative to the direction of the insertion of the time card therein to print a variety of items on specific printing columns of the time card, said card locking device comprising: a locking lever having a front part, said front part including a locking piece located on one side of the card guide passage; a locking counter-plate spaced from said locking piece located on the side of the card guide passage opposite said one side, said locking lever containing a spring means for resiliently rotating said locking lever toward the card guide passage so as to clamp the inserted time card between said locking piece and said locking counter-plate; and first cam means for engaging said locking lever to displace said locking lever away from the card guide passage against the resilient force of said spring means, said first cam means being responsive to rotation of the motor when actuated by the switch, to disengage said locking lever from said first cam means so that said spring means rotates said locking lever against the inserted time card to clamp the inserted time card so as to be immovable, and to displace said locking lever apart from the card guide passage to disengage said locking lever from the time card.

2. A card locking device as in claim 1, wherein said locking piece extends from said front part of said locking lever at a certain forward inclination angle relative to the plane in which the card guide passage receives the inserted time card.

3. A card locking device as in claim 1, wherein said time recorder includes a second cam means, having a cam shaft, rotated by the motor, for transversely displacing the dot printer while performing printing on the inserted time card, said first cam means being secured coaxially to the cam shaft of the second cam means for rotation therewith.

4. In a time recorder having a card guide passage for receiving a time card therein, a wire type dot matrix printer, a motor for displacing the printer transversely relative to the direction of insertion of the time card therein to print a variety of items on specific printing columns of the time card, a switch, responsive to insertion of the time card into the card guide passage, for activating the motor, the improvement comprising:

a locking lever having a front part, said front part including a locking piece located on one side of the card passage;

a locking counter-plate spaced from said locking piece located on the side of the card guide passage opposite said one side, said locking lever containing a spring means for resiliently rotating said locking lever toward the card guide passage so as to clamp the inserted time card between said locking piece and said locking counter-plate; and first cam means for engaging said locking lever to displace said locking lever away from the card guide passage against the resilient force of said spring means, said first cam means being responsive to rotation of the motor when activated by the switch, to disengage said locking lever from said cam means so that said spring means rotates said locking lever against the inserted time card to clamp the inserted time card so as to be immovable, and to displace said locking lever apart from the card guide passage to disengage said locking lever from the time card.

5. The improvement as in claim 4, wherein said locking piece extends from said front part of said locking lever at a certain forward inclination angle relative to the plane in which the card guide passage receives the inserted time card.

6. In a time recorder as in claim 4, wherein the time recorder includes a second cam means, having a cam shaft, rotated by the motor, for transversely displacing the dot printer while performing printing on the inserted time card, the improvement wherein said first cam means is secured coaxially to the cam shaft of the second cam means for rotation therewith.

* * * * *